United States Patent
Tsirkin et al.

(10) Patent No.: US 12,373,125 B2
(45) Date of Patent: Jul. 29, 2025

(54) RANDOMIZATION-BASED PROTECTION FOR MEMORY DEDUPLICATION

(71) Applicant: Red Hat, Inc., Raleigh, NC (US)

(72) Inventors: Michael Tsirkin, Westford, MA (US); Uri Lublin, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 78 days.

(21) Appl. No.: 18/204,076

(22) Filed: May 31, 2023

(65) Prior Publication Data

US 2024/0402931 A1    Dec. 5, 2024

(51) Int. Cl.
*G06F 3/06* (2006.01)

(52) U.S. Cl.
CPC .......... *G06F 3/0641* (2013.01); *G06F 3/0608* (2013.01); *G06F 3/0673* (2013.01)

(58) Field of Classification Search
CPC ..... G06F 3/0641; G06F 3/0608; G06F 3/0673
See application file for complete search history.

(56) References Cited

U.S. PATENT DOCUMENTS

| | | | |
|---|---|---|---|
| 9,094,195 B2 | 7/2015 | Leppard et al. | |
| 9,536,088 B1 | 1/2017 | Igotti et al. | |
| 9,652,634 B2 | 5/2017 | Wang et al. | |
| 9,836,241 B1 | 12/2017 | Tsirkin et al. | |
| 9,983,827 B1 * | 5/2018 | Tsirkin | G06F 3/0641 |
| 10,558,377 B2 | 2/2020 | Cheriton | |
| 10,691,362 B2 * | 6/2020 | Tsirkin | G06F 12/1009 |
| 2018/0150260 A1 * | 5/2018 | Tsirkin | G06F 3/0641 |
| 2019/0196731 A1 * | 6/2019 | Sapuntzakis | G06F 3/0608 |

OTHER PUBLICATIONS

RFC2410 A Network Working Group Request for Comments: 2410 published in Nov. 1998 that details the NULL Encryption Algorithm. (Year: 1998).*
J.K. Periasamy, et al., "An Enhanced Secure Content De-Duplication Identification and Prevention (ESCDIP) Algorithm in Cloud Environment", Neural Computing and Applications, Springer, Jan. 23, 2019, 10 pages.
Yuan Zhang, et al., "Secure Password-Protected Encryption Key for Deduplicated Cloud Storage Systems", Jul.-Aug. 2022, Downloaded on May 19, 2021 from IEEE Xplore, 18 pages.

* cited by examiner

*Primary Examiner* — Tim T Vo
*Assistant Examiner* — Janice M. Girouard
(74) *Attorney, Agent, or Firm* — Kilpatrick Townsend & Stockton LLP

(57) ABSTRACT

Systems, methods, and apparatuses for managing memory usage in virtualized computing environments are provided herein. An example method includes generating a random key, associating the key with a page or range of pages in a memory, and selectively deduplicating pages based upon the key associated with each respective page.

19 Claims, 6 Drawing Sheets

RANDOMIZATION-BASED PROTECTION FOR MEMORY DEDUPLICATION

BACKGROUND

Memory deduplication is employed in virtualized computing environments to reduce demand for space in memory. Blocks of memory called pages that are identical can be condensed into a single page that is referenced by multiple applications. Such an arrangement is especially helpful in situations where multiple applications that run simultaneously utilize common resources such as libraries.

SUMMARY

Systems, methods, and apparatuses are provided for managing memory usage in virtualized computing environments. In an example, a method comprises generating a random key, associating the key with a page or range of pages in a memory, and selectively deduplicating pages based upon the key associated with each respective page.

In another example, a system comprises a first memory and a processing device, operatively coupled to the first memory to generate a random key, associate the key with a page or range of pages in a second memory, and selectively deduplicate pages based upon the key associated with each respective page.

In yet another example, a non-transitory computer-readable memory stores instructions which, when executed by a processing device, cause the processing device to generate a random key, associate the key with a page or range of pages in a memory, and selectively deduplicate pages based upon the key associated with each respective page.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter.

BRIEF DESCRIPTION OF THE DRAWINGS

The description will be more fully understood with reference to the following figures, which are presented as exemplary aspects of the disclosure and should not be construed as a complete recitation of the scope of the disclosure, wherein.

DETAILED DESCRIPTION

Techniques are disclosed herein for automatically managing memory usage in virtualized computing environments. Memory deduplication is commonly used in virtualized computing environments to reduce demand for memory capacity. Multiple applications or processes that may run simultaneously may utilize pages in memory that are identical. For example, two applications may each reference a standard library which causes one or more pages from the library to be loaded into memory. Without deduplication, each application may load all pages into memory that are needed for that application to function, and thus a high probability would exist that one or more pages which are needed by both applications would be loaded into memory twice (i.e. duplicated). Deduplication solves this problem by identifying duplicate pages, removing all copies of the page except one, and configuring all applications using the duplicate page or pages to reference the remaining page.

This solution is highly effective for reducing unnecessary memory usage, but can expose data stored in deduplicated pages to vulnerabilities. These vulnerabilities are particularly prominent when pages are deduplicated between different users, but can occur in a wide variety of situations in which proper separation of sensitive data is not maintained. It is therefore desirable to implement a system that can automatically track and keep separate data from different sources, while still allowing deduplication of unnecessary pages where possible. Such a system would permit the benefits described above to be realized while greatly reducing the risks.

Figure 1:
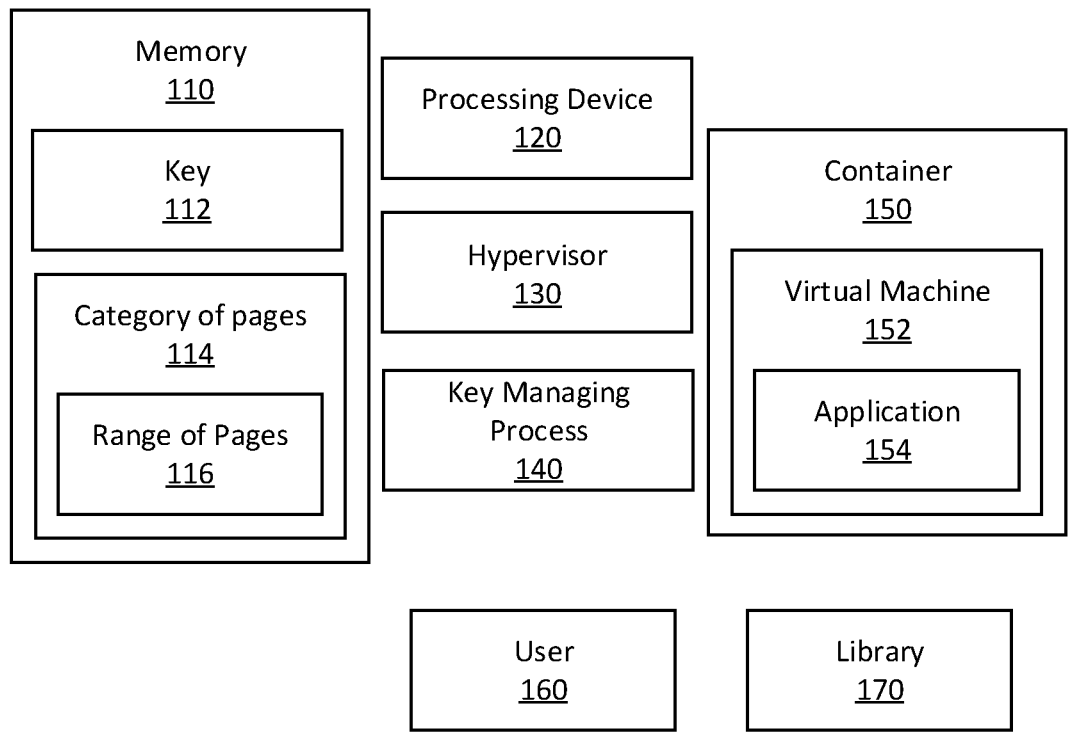
FIG. 1 illustrates an example block diagram of a system for managing memory usage, according to example embodiments of the present disclosure.

FIG. 1 illustrates an example block diagram 100, according to example embodiments of the present disclosure. A memory 110 contains a key 112 and a category of pages 114 comprising a range of pages 116. The memory 110 may contain additional pages, some of which may be in additional categories, may be in the category of pages 114, or may not be in a category. The memory 110 may also contain keys in addition to the key 112. In this example scenario, the key 112 is associated with the category of pages 114, and is thus in turn associated with each page contained within the range of pages 116.

A processing device 120 in communication with the memory 110 executes a hypervisor 130, a key managing process 140, and a container 150. In some example scenarios, the key managing process 140 may execute within the hypervisor 130. A virtual machine 152 executes within the container 150, and an application 154 executes within the virtual machine 152. In various example scenarios, any number of containers, virtual machines, and applications may be present. Multiple applications may execute within the virtual machine 152, multiple virtual machines may execute within the container 150, and multiple containers may be executed by the processing device 120. The virtual machine 152 may also be split across multiple containers, with some processes and applications executing in the container 150 and others executing in one or more additional containers.

A library 170 may be accessed by the processing device 120 for use by the application 154, virtual machine 152, or container 150. The library 170 may be kept in a non-volatile storage locally or may be remotely accessed by the processing device 120 as needed. When accessing the library 170, the processing device 120 may load one or more pages from the library 170 into the memory 110. Multiple libraries may be present.

A user 160 may interact with the processing device 120. The user 160 may be local (i.e. geographically close to the processing device 120) or may be remote (i.e. geographically distant from the processing device 120). Multiple users may interact with the processing device 120 simultaneously, and in more sophisticated examples, multiple processing devices may be included.

Figure 2:
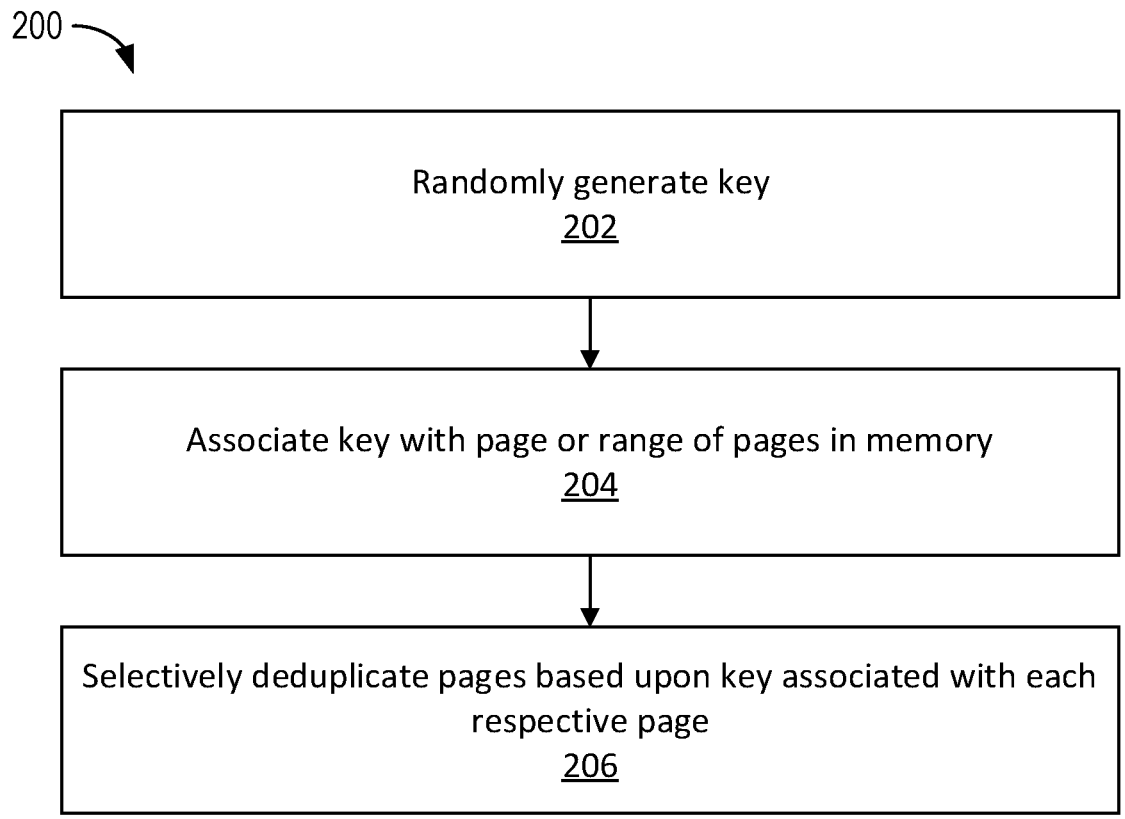
FIG. 2 illustrates a flow chart for an example method for managing memory usage, according to example embodiments of the present disclosure.

FIG. 2 illustrates a flow chart for an example method 200, according to example embodiments of the present disclosure. It will be appreciated that the example method 200 is presented at a high level of abstraction for illustrative purposes, and that many examples may involve additional steps that are included in or additional to the steps presented herein.

At block 202, an example system randomly generates a key. The key may be of any length and may be generated via a true random process such as measuring a physical phenomenon or a pseudorandom process such as algorithmic generation. Generation of the key may be responsive to detecting that a new key is needed. For example, upon detecting a connection from a new user, a new key may be needed in order to properly sort and identify pages in a memory 110 (see FIG. 1) belonging to that user.

Figure 6:
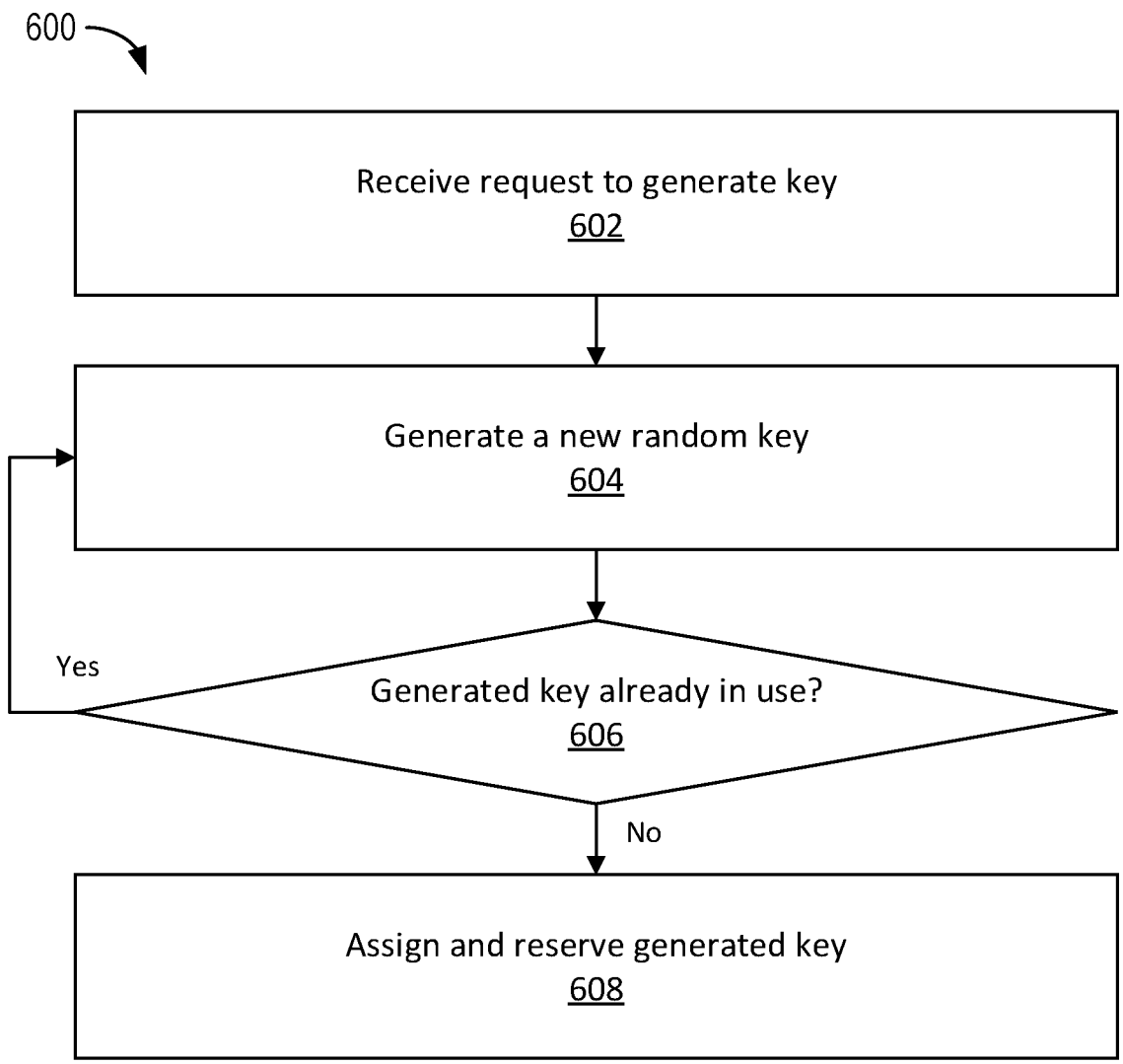
FIG. 6 illustrates a flowchart for an example method for managing keys, according to example embodiments of the present disclosure.

Key 112 generation may be handled by a key managing process 140 (see FIG. 1, FIG. 6). For example, a key managing process 140 may be desirable in situations where concerns exist regarding accidentally generating and assigning a same key 112 twice. The key managing process 140 may track key 112 associations internally, or may merely coordinate key 112 generation and assignment, leaving page association to a hypervisor 130 or other process. For example, the key managing process 140 may be configured to execute responsive to a new user 160 connecting. The key managing process 140 may then determine that a new key 112 is needed, generate the new key 112, assign the new key 112 to the new user 160, and then exit, allowing applications 154 associated with the user 160 to coordinate directly with a hypervisor 130 to associate individual pages or ranges of pages 116 with the new key 112. The hypervisor 130 may, for example, request or expect a key 112 to be provided by originating applications 154 with the creation of each new page. In such an arrangement, an application 154 stores the new key 112 generated by the key managing process 140 and provides the hypervisor 130 with that new key 112 for every page or range of pages 116 created.

At block 204, the example system associates the key generated at block 202 with a page or a range of pages in memory. The page or range of pages 116 may belong to a category 114 corresponding to a reason for the key 112 being generated. For example, the page or range of pages 114 may belong to a common user 160, application 154, virtual machine 152, or library 170. In an example, associating the page or the range of pages 116 with the key 112 may involve storing the key 112 in a table with one or more page identifiers. Any data structure, however, may be used to associate they key 112 with the page or the range of pages 116, including but not limited to a single large table or list that pairs individual page identifiers or ranges of pages with respective keys 112 or separate tables or lists of pages or ranges of pages 116 associated with each respective key 112. For example, a separate table may be created for each key 112 that is in use by the system. Data structures associating keys 112 with respective pages or ranges of pages 116 may be stored and maintained by any process, including but not limited to a dedicated key managing process 140 or a hypervisor 130.

Arrangements that utilize a public table for storage of key associations may be most appropriate for open data (i.e. data that is not especially sensitive and may be utilized by multiple users). Examples of open data may include but are not limited to pages from a library 170, a shared application 154, or operating system services. Closed data (i.e. data that is of a higher security concern and which should be kept private), may require more secure arrangements, such as individual tables for each respective key 112. Examples of closed data include but are not limited to identifying information or passwords. Some data may not be completely open or closed. For example, two or more users 160 may wish to share data among each other that should not be made publicly available. In such a situation, segregated data structures may be appropriate for users 160 which should and should not have access to a set of data.

At block 206, the example system selectively deduplicates pages based upon the key associated with each respective page. For example, two identical pages that are associated with a same key 112 would be condensed by the example system, while the same two pages would not be condensed when associated with differing respective keys 112. Condensing may comprise removing one or more duplicate pages and configuring an application 154 or process that uses the removed page to reference a remaining instance of the page.

For example, when a first page or range of pages 116 is associated with a first key 112 and an identical second page or range of pages 116 is associated with the first key 112, the second page or range of pages 116 would be deleted and any application 154 or applications that use the second page or range of pages 116 would be configured to use the first page or range of pages 116 instead. When a first page or range of pages 116 is associated with a first key 112 and an identical second page or range of pages 116 is associated with a second key 112, however, no deduplication occurs. In this way pages (and the data they contain) can be segregated in a way that prevents undesired and unauthorized access.

Figure 3:
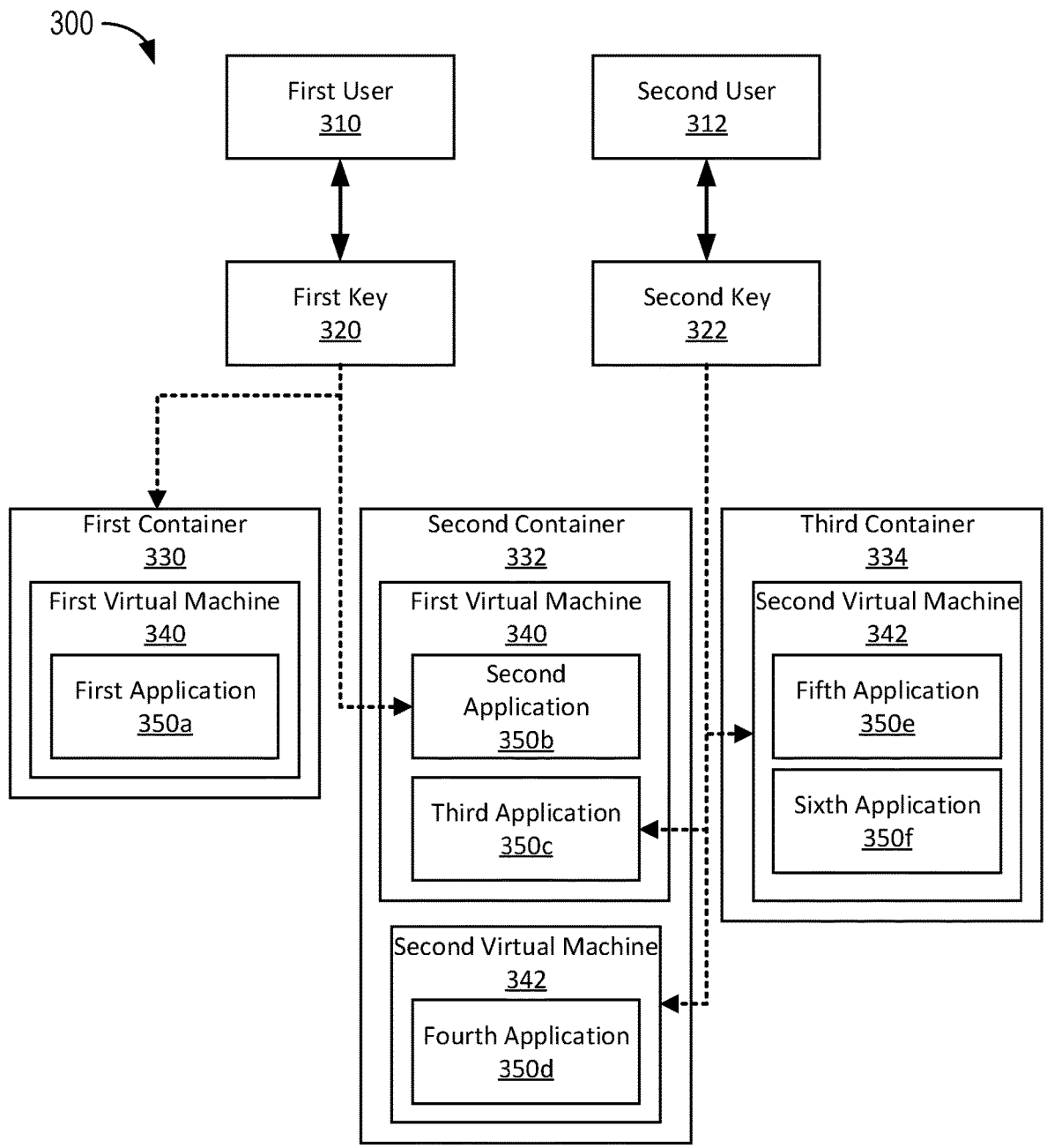
FIG. 3 illustrates an example system for managing memory usage, according to example embodiments of the present disclosure.

FIG. 3 illustrates an example system 300, according to example embodiments of the present disclosure. The example system 300 is executing three containers: a first container 330, a second container 332, and a third container 334. A first virtual machine 340 is executing a first application 350*a* (collectively, applications 350), a second application 350*b*, and a third application 350*c*. A second virtual machine 342 is executing a fourth application 350*d*, a fifth application 350*e*, and a sixth application 350*f*.

It should be noted that in the present example, the first virtual machine 340 and the second virtual machine 342 are each executing across two containers, with the applications 350 distributed across containers according to resource demands of each application. It should also be noted that the second container 332 executes applications from both the first virtual machine 340 and the second virtual machine 342. This is to illustrate that any conceivable configuration of virtual machines, containers, and applications may be encountered; there may, alternatively, be many examples where a single virtual machine executes entirely within one container which executes no other virtual machines, for example. It will also be noted that containers may execute within virtual machines.

In this example scenario, first key 320 is assigned to a first user 310 and a second key 322 is assigned to a second user 312. The first user 310 owns the first container 330 along with the first application 350a and the second application 350b. Therefore, the first key 320 is associated with the first container 330 and the second application 350b, and pages in memory that are created or used by the first container 330 (including processes and applications running within the first container 330) and the second application 350b may be deduplicated with one another. It should be noted that because the first application 350a executes entirely within the first container 330 which is associated with the first key 320, there is no need to separately associate the first application 350a with the first key 320. The second owner 320 owns the third application 350c and the second virtual machine 342. Therefore, the second key 322 is associated with the third application 350c and the second virtual machine 342, and pages in memory that are created or used by the second virtual machine 342 (including processes and applications running within the first container 330) and the third application 350c may be deduplicated with one another.

As is illustrated here, a key may be associated with any application or process which creates pages in memory, including containers, virtual machines, or applications executing within containers or virtual machines. It should also be noted that the first virtual machine 340, the second container 332, and the third container 334 are not associated with the first key 320 or the second key 322. These processes may be associated with a null key or no key at all, and pages created or used by these processes may be deduplicated with one another as if these processes possessed a same key.

In various examples, the first user 310 and the second user 312 may be understood to be any of a number of entities. For example, while the first user 310 and the second user 312 may be human users, they may also be additional virtual machines, libraries, containers, or applications external to the first container 330, the second container 332, and the third container 334, but which cause at least one process or application to execute in one or more of the first container 330, the second container 332, or the third container 334. For example, the first user 310 may be an external application requesting a service that is then executed in the first container 330. In such a scenario, trying to associate the service with a human user may be impractical as that human user is not directly interacting with the system 300 (or, if the external application was initiated automatically, the human user may not exist at all), and thus the external application would be the first user 310.

Figure 4:
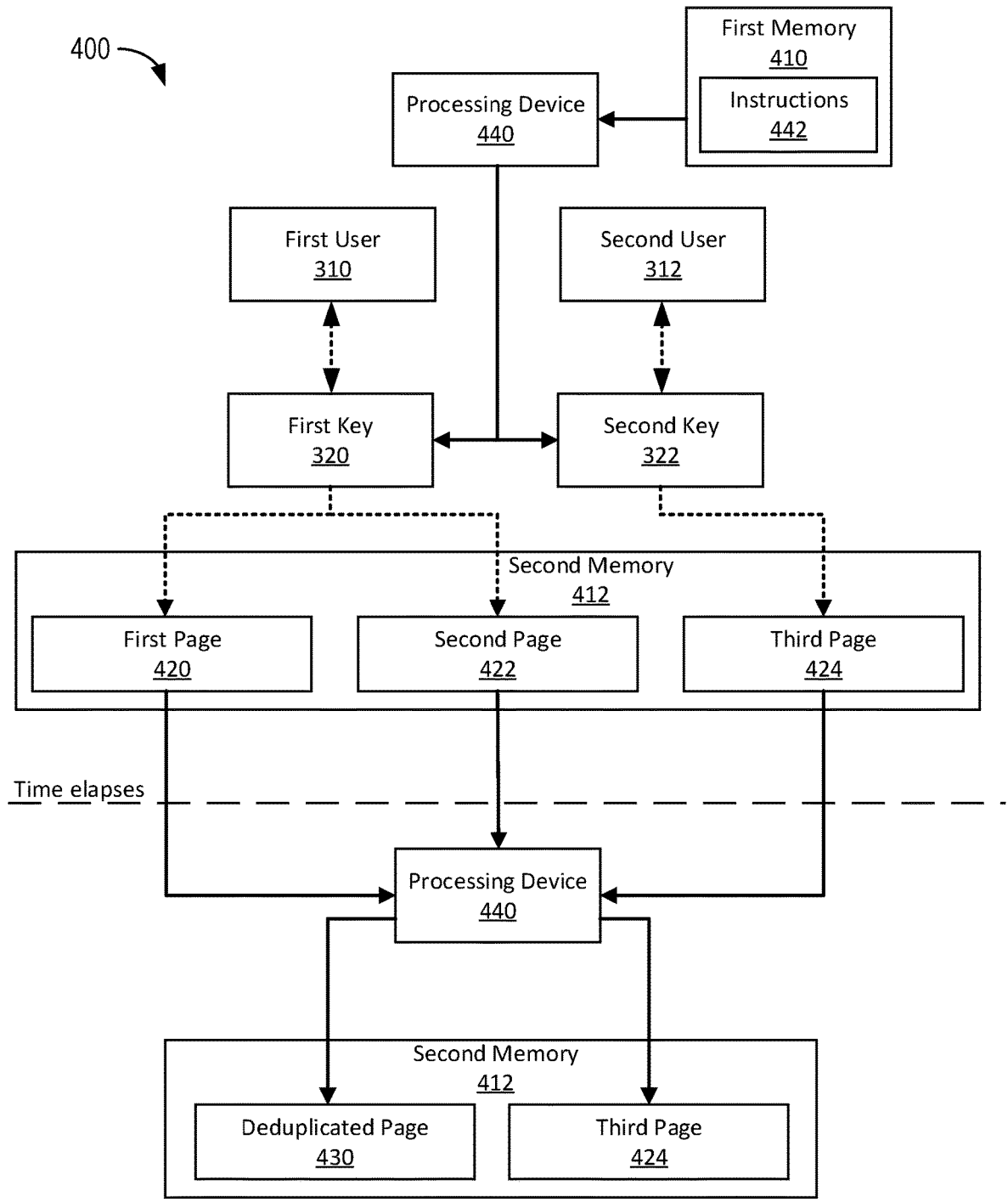
FIG. 4 illustrates an example system before and after deduplication, according to example embodiments of the present disclosure.

FIG. 4 illustrates an example system 400 before and after deduplication, according to example embodiments of the present disclosure. A processing device 440 is operatively coupled to a first memory 410 and is in communication with a second memory 412. The first memory 410 contains instructions 442 which, when executed by the processing device 440, cause the processing device 440 to assign a first key 320 to a first user 310 and a second key 322 to a second user 312 (see FIG. 3). The processing device 440 then associates the first key 320 with a first page 420 and a second page 422 in the second memory 412. Likewise, the processing device 440 associates the second key 322 with a third page 424 in the second memory 412.

After a period of time elapses, the processing device 440 executes further instructions 442 which cause the processing device 440 to run a deduplication routine. The processing device 440 inspects the first page 420, the second page 422, and the third page 424 and the respective key associations of those pages. In this example scenario, the first page 420, the second page 422, and the third page 424 are all identical in content, and since the first page 420 and the second page 422 are both associated with the first key 320, the processing device 440 condenses them into a single deduplicated page 430. The third page 424 is retained as a separate page because the third page 424 is associated with the second key 322, which differs from the first key 320. The processing device 440 may repeat the deduplication routine one or more times, but as long as the third page 424 is associated with a different key from that which is associated with the deduplicated page 430, the second memory 412 will remain in a state which is illustrated herein.

It will be appreciated that the system 400 is an exceptionally simplified system, and that in practice many additional pages, keys, users, processing devices, and memories may be included. In an example, the first memory 410 and the second memory 412 may also be a same memory (i.e. the instructions 442 may be stored in the same memory as the first page 420, the second page 422, and the third page 424). The processing device 440 may be configured to deduplicate pages periodically, or may be configured to deduplicate pages responsive to a predetermined condition being met. For example, the processing device 440 may be configured to detect when the second memory 412 approaches a maximum capacity, and then responsive to detecting that the second memory 412 is approaching the maximum capacity, the processing device 440 may be configured to execute the deduplication routine to free up space in the second memory 412.

Figure 5:
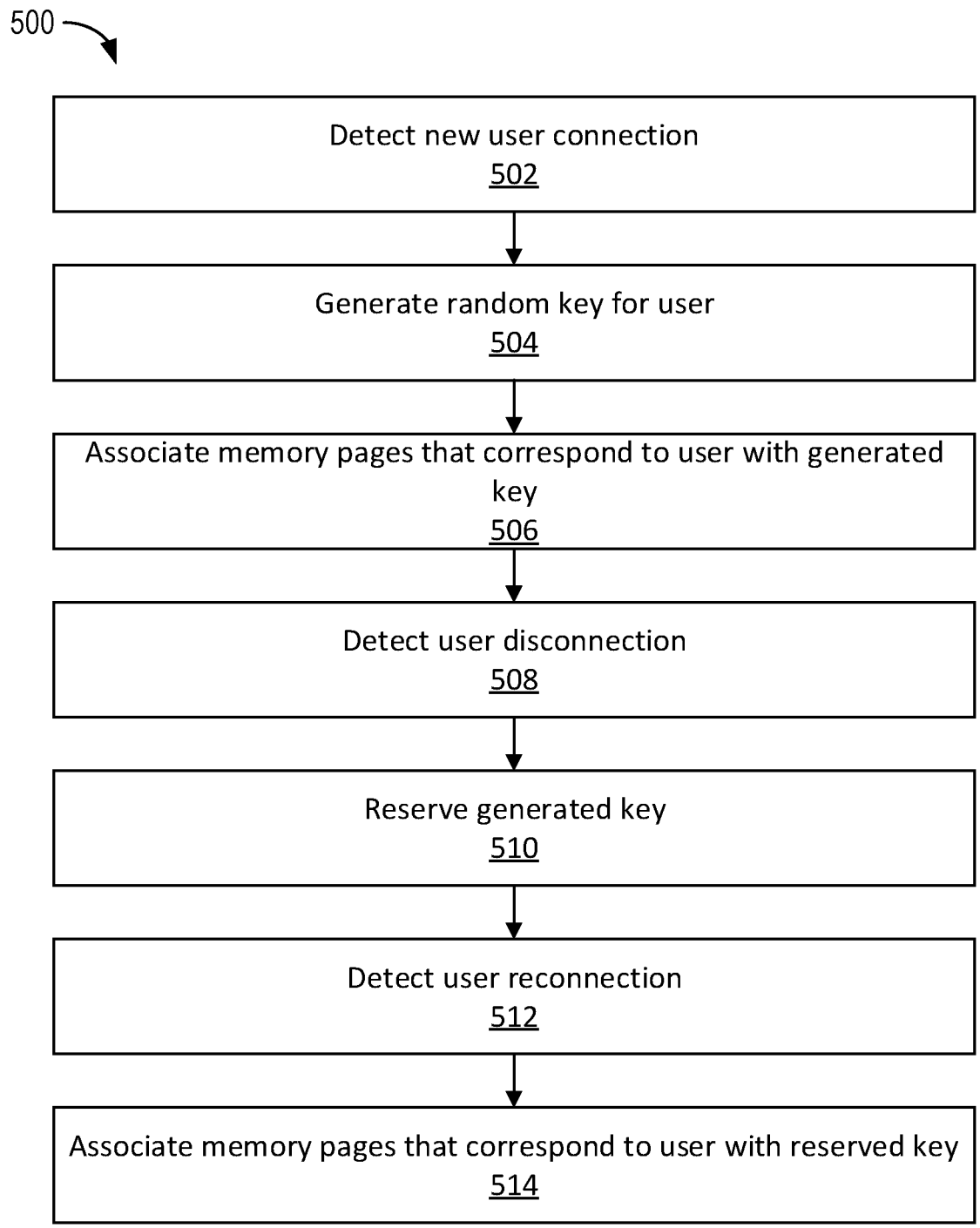
FIG. 5 illustrates a flowchart for an example method for managing user connections, according to example embodiments of the present disclosure.

FIG. 5 illustrates a flowchart for an example method 500 for managing user connections, according to example embodiments of the present disclosure. It will be appreciated that the example method 500 is presented at a high level of abstraction for illustrative purposes, and that many examples may involve additional steps that are included in or additional to the steps presented herein.

At block 502, an example system detects a new user connection. In this example scenario, a new user 160 connection is defined as a connection by a user 160 which does not already have an assigned key 112. It should also be noted that the new user 160 may be any of a number of entities that are external to the example system, including but not limited to a human user, a virtual machine 152, a library 170, or an application 154 (see FIG. 3). Determining that a user 160 is new may involve a processing device 120 searching through an index of keys and respective users to determine if the user 160 is already associated with a key 112.

At block 504, the system generates a random key for the user (see FIG. 2). The key 112 may be sent to the user 160 for use when accessing pages later, or may be maintained internally within the system. The system may also check an index of keys at this time to verify that the generated key 112 is not a duplicate (see FIG. 6), and update the index of keys to reflect the generated key 112 and associated new user 160. When a duplicate key 112 is generated, the system may be configured to generate a second key 112 and then check for duplicates again.

At block 506, the system associates memory pages that correspond to the user with the key generated at block (see FIG. 3). Depending on particular implementations, this may involve the user 160 sending the key 112 to a processing device 120 along with every page or range of pages 116 that is to be loaded into memory 110. Alternatively, a key managing process 140 or a hypervisor 130 may maintain a list of keys 112 and their respective users 160 which can be used to associate pages or ranges of pages 116 with an appropriate key 112 upon loading based upon which user 160 requested that a page or range of pages 116 be loaded. In this way, the system can operate much more transparently from a user 160 perspective, but a greater computational burden is placed upon a centralized management system.

At block 508, the system detects that the user has disconnected. It is often desirable that continuity be maintained between user 160 sessions, so upon detecting that a user 160 has disconnected, the system may be configured to perform certain tasks that allow a user 160 to more easily resume a session upon reconnecting.

At bock 510, the system reserves the key which is assigned to the user. Since pages or ranges of pages 116 may remain in memory 110 after the user 160 disconnects and may be saved to storage along with the associated key 112, maintaining a same key 112 between sessions may be important for data security and convenience purposes. The key 112 may be saved to non-volatile storage so that continuity may be maintained even when system power is interrupted. In this way, a user 160 can be assigned a key 112 once and use that key 112 across many different sessions. This reduces demand on key managing processes 140 and provides aforementioned continuity benefits.

At block 512, the system detects a reconnection of the user. Having saved the associated key 112 at block 510, the system may bypass key 112 generation and instead assign the reserved key 112 to the user 160 for continued use. If any pages or ranges of pages 116 remain in memory 110 from a previous session, the system may make these pages or ranges of pages 116 available to the user 160.

At block 514, the system associates pages or ranges of pages that are created or used by the user with the reserved key. This is very similar to block 506, just with a key 112 that has been retrieved from storage rather than a key 112 which has just been generated.

FIG. 6 illustrates a flowchart for an example method 600 for managing keys, according to example embodiments of the present disclosure. It will be appreciated that the example method 600 is presented at a high level of abstraction for illustrative purposes, and that many examples may involve additional steps that are included in or additional to the steps presented herein.

At block 602, a key managing process receives a request to generate a key. This request may originate from a different portion of the key managing process 140, a hypervisor 130, a user 160, or another process. The request to generate a key 112 may be responsive to a determination that a user 160 has connected that has not connected before and thus does not already have a stored key 112 (see FIG. 5).

For example, a user 160 may connect to a system which causes a hypervisor 130 to check an index to determine whether a key 112 has been previously assigned to the user 160. Responsive to the determination that no key 112 can be found corresponding to the user 160, the hypervisor 130 may be configured to send a request to the key managing process 140 to generate and assign a key 112 to the new user 160.

At block 604, the key managing process generates a new random key (see FIG. 2). Key generation may take place within the key managing process 140 itself, or the key managing process 140 may in turn send a request to another process for a random number. For example, when true random number generation is desired, it is usually necessary to rely on methods other than algorithmic number generation, as these processes always follow a reproducible path based upon an initial seed. Therefore, in order to generate a truly random number, a physical phenomenon external to the system which changes unpredictably is usually measured. This requires specialist hardware and as a result is usually outsourced to a separate system that specializes in random number generation. The key managing process 140 may make use of such a system by requesting a random number of an appropriate length to act as a new key 112.

At block 606, the key managing process checks to verify that the generated key is not already in use. While key collisions are likely to be exceptionally rare in practical examples, there still exists a possibility that two users could, by chance, be assigned a same key 112. It may therefore be necessary, depending on a required security and reliability of a system, to implement a system that ensures that key collisions do not occur. This can be accomplished by comparing each generated key 112 with an existing index of keys to determine whether the generated key 112 is present in the index of keys.

When the generated key 112 is present in the index of keys, a duplicate key 112 has been generated and the key managing process 140 returns to block 604 to generate a new key 112. When the generated key 112 is not present in the index of keys, the key managing process 140 proceeds to block 608.

At block 608, the key managing process assigns the generated key to the user and reserves the generated key for future use by the user. Assigning the generated key 112 to the user 160 may include but is not limited to sending the generated key 112 to the user 160, updating an index of keys 112 and respective users 160, and/or sending the generated key 112 to a hypervisor 130. When assigning the generated key 112 includes updating an index of keys 112 and respective users 160, no further action may need to be taken to reserve the generated key 112 for future use by the user 160. When assigning the generated key 112 does not include updating an index of keys 112 and respective users 160, however, the key managing process 140 may be configured to update an index of keys 112 and respective users 160 for internal use when performing the tasks at block 606.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

What is claimed:

1. A method, comprising:
generating a key, wherein the key is randomly generated;
associating the key with a page or range of pages in a memory;
selectively deduplicating pages based upon the key associated with each respective page;
reserving the key while a user, virtual machine, container, application, or library is inactive; and
reassociating the key with the user, the virtual machine, the container, the application, or the library responsive to the user, the virtual machine, the container, the application, or the library becoming active again.

2. The method of claim 1, further comprising associating a category of memory pages with a single key.

3. The method of claim 2, wherein the category of memory pages is based upon at least one of an originating user, an originating virtual machine, an originating container, an originating application, or an originating library.

4. The method of claim 2, wherein the associating includes associating at least one category of pages with one of a null key or no key.

5. The method of claim 4, wherein the deduplicating includes deduplicating pages which are associated with the null key or no key with other pages that have been assigned the null key or no key.

6. The method of claim 1, wherein the deduplicating includes deduplicating pages that possess a same key with one another, and not deduplicating pages that possess differing keys with one another.

7. The method of claim 1, wherein the generating and associating is performed by a centralized key managing process.

8. The method of claim 1, wherein a hypervisor stores data associating the page with the key.

9. A system, comprising:
a first memory; and
a processing device, operatively coupled to the first memory, to:
generate a key, wherein the key is randomly generated;
associate the key with a page or range of pages in a second memory;
selectively deduplicate pages based upon the key associated with each respective page;
reserve the key while a user, virtual machine, container, application, or library is inactive; and
reassociate the key with the user, the virtual machine, the container, the application, or the library responsive to the user, the virtual machine, the container, the application, or the library becoming active again.

10. The system of claim 9, wherein the first memory and the second memory are a same memory.

11. The system of claim 9, wherein the processing device is further configured to associate a category of memory pages with a single key.

12. The system of claim 11, wherein the category of memory pages is based upon at least one of an originating user, an originating virtual machine, an originating container, an originating application, or an originating library.

13. The system of claim 11, wherein the processing device is configured to assign at least one category of pages one of a null key or no key.

14. The system of claim 13, wherein the processing device is configured to deduplicate pages that have been assigned the null key or no key with other pages that have been assigned the null key or no key.

15. The system of claim 9, wherein the processing device is configured to deduplicate pages that possess a same key with one another, and not deduplicate pages that possess differing keys with one another.

16. A non-transitory computer-readable storage medium storing instructions which, when executed by a processing device, cause the processing device to:
generate a key, wherein the key is randomly generated;
associate the key with a page or range of pages in a memory;
selectively deduplicate pages based upon the key associated with each respective page;
reserve the key while a user, virtual machine, container, application, or library is inactive; and
reassociate the key with the user, the virtual machine, the container, the application, or the library responsive to the user, the virtual machine, the container, the application, or the library becoming active again.

17. The non-transitory computer-readable storage medium of claim 16, wherein the instructions further cause the processing device to associate a category of memory pages with a single key.

18. The non-transitory computer-readable storage medium of claim 17, wherein the category of memory pages is based upon at least one of an originating user, an originating virtual machine, an originating container, an originating application, or an originating library.

19. The non-transitory computer-readable storage medium of claim 16, wherein the instructions further cause the processing device to deduplicate pages that possess a same key with one another, and not deduplicate pages that possess differing keys with one another.

* * * * *